3,060,308
ILLUMINATED OPTICAL DEVICE
Anton J. Fortuna, R.R. 2, Clinton, Ind.
Filed May 8, 1959, Ser. No. 811,929
1 Claim. (Cl. 240—6.4)

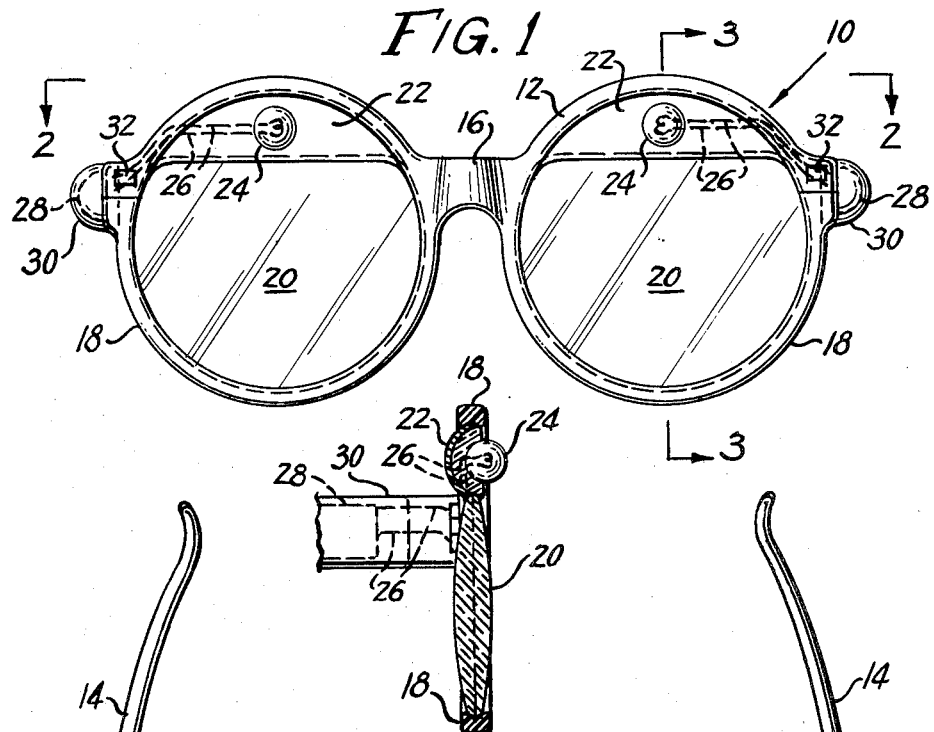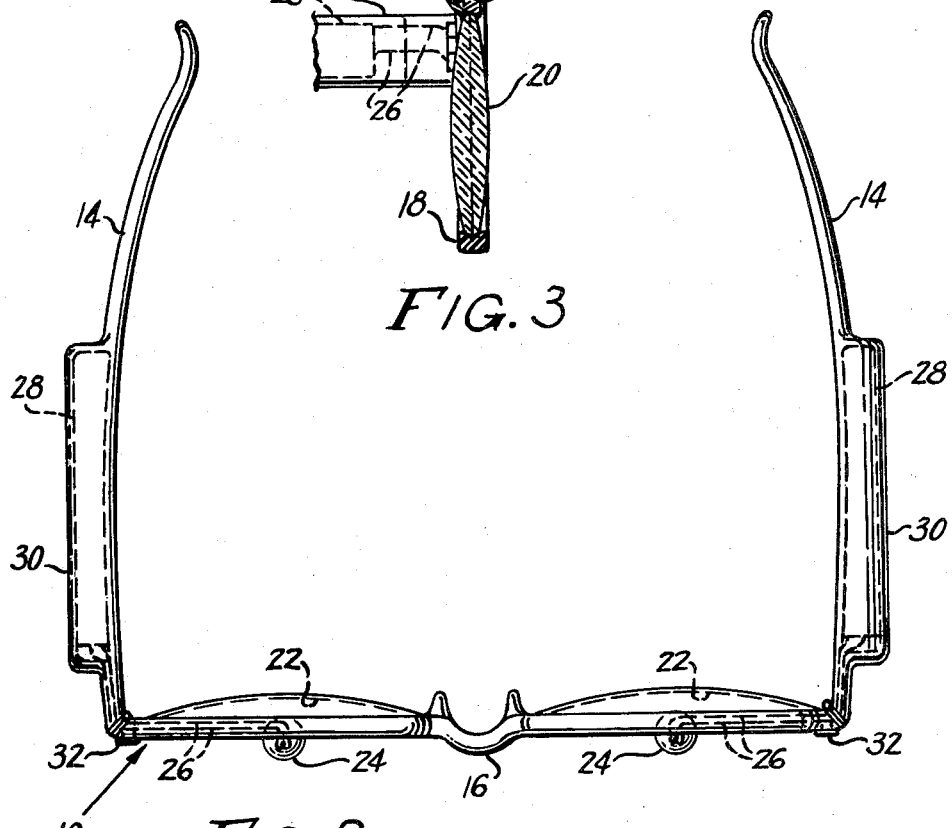

This invention relates to spectacles or other optical devices provided with illuminating means, and it particularly relates to optical devices of this type which are provided with self-contained illuminating units.

Various prior attempts have been made to combine illuminating means with spectacles or the like; however, none of these prior attempts adequately served their intended purposes because they were either too bulky, heavy, clumsy and complex, or were ineffective in their operation.

It is one object of the present invention to overcome the aforementioned disadvantages by providing an illuminated optical device which is relatively simple in construction but highly effective in its operation.

Another object of the present invention is to provide an illuminated optical device which is easy to use and handle.

Other objects of the present invention are to provide an improved illuminated optical device, of the character described, that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawings in which:

FIG. 1 is a front perspective view of a device embodying the present invention.

FIG. 2 is a top plan view taken on line 2—2 of FIG. 1.

FIG. 3 is a sectional view taken on line 3—3 of FIG. 1.

Referring in greater detail to the drawing wherein similar reference characters refer to similar parts, there is shown a pair of spectacles 10 comprising a frame assembly 12 having hinged ear-pieces 14 and a bridge portion 16 as well as lens frames 18. The frame assembly is preferably constructed of a plastic such as vinyl resin or the like, but any other desirable material may be used. Lenses 20 are mounted within the lens frames 18 in the ordinary manner.

At the upper portion of each of the lens frames 18, immediately above the upper edges of the corresponding lens 20 but supported by the upper edge of the lens frame 18, is an elongated, concave reflector 22. Each of these reflectors 22 defines a concave area at the center of which is provided a socket fitted with an electric light bulb 24. The bulb socket in each lens frame 18 is connected by wires 26 to a corresponding dry cell battery 28 releasably positioned in a battery housing 30 integral with the respective ear piece 14. Although not specifically illustrated, it is to be understood that ordinary type access means, such as an open end closed by a screw-plug or the like, are provided in each housing 30 to permit insertion and removal of the batteries. Each housing 30 is also internally provided with a spring-pressed electrical contact for the battery similar to those generally used in standard type flashlights.

The bulbs 24 are preferably separately illuminable and for this purpose separate electric switch means 32 are provided on each lens frame 18 adjacent its hinged connection with the respective ear piece 14. If desired, however, the bulbs 24 may be connected in series and one switch 32 can be used to simultaneously illuminate them both.

The device described above has been illustrated as including a pair of reading spectacles in the combination. However, the invention can be utilized with any optical device such as goggles, hoods, etc. It is especially suitable for night fishermen, electrical workers, or wherever use of both hands is necessary for the work but where an independent source of light is required for the purpose. Furthermore, if desired, the bulbs 24 can be provided in a circuit which can be energized either by batteries, such as shown at 28, or by direct or alternating current sources remote from the glasses. This would be especially useful where the batteries fail and house current or the like is available.

The device embodying the present invention is very effective in that the provision of the elongated reflectors behind the light bulbs and above each of the lenses affords a clear, bright, non-glare illumination for each eye; the reflectors acting both as shields to protect the eyes from the glare of the bulbs and as reflecting and diffusing means for the light whereby the light is spread both laterally and forwardly.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

An illuminated optical device comprising an optical frame assembly including a pair of lens supporting frames, a lens opening in each said lens supporting frame, a lens mounted in each said opening, an elongated concave reflector mounted within said opening of each said lens supporting frame and extending across an upper chord of the opening in each said lens supporting frame, the lower edge of each said reflector providing support means for the upper periphery of the lens mounted in said same frame opening, a light bulb socket mounted centrally of said elongated reflector on the forward surface thereof, a light bulb in each said socket, electric battery means mounted in said frame assembly and means to controllably connect each said light bulb to said electric battery means, said frame assembly including a pair of rearwardly extending hinged ear pieces each having a smooth continuous surface on the side thereof adjacent the face of the user when in use, and a battery housing integral with each said ear piece extending outwardly from the opposite surface of each said ear piece.

References Cited in the file of this patent

UNITED STATES PATENTS

| | | |
|---|---|---|
| 2,638,532 | Brady | May 12, 1953 |
| 2,904,670 | Calmes | Sept. 15, 1959 |

FOREIGN PATENTS

| | | |
|---|---|---|
| 748,733 | France | Apr. 25, 1933 |
| 491,677 | Great Britain | Sept. 9, 1938 |